(12) United States Patent
Reiersen et al.

(10) Patent No.: US 12,082,537 B2
(45) Date of Patent: Sep. 10, 2024

(54) WOOD FIBERS FOR ENHANCED BINDING IN GROWING MEDIA

(71) Applicant: Jiffy International AS, Kirstiansand (NO)

(72) Inventors: Herald Reiersen, Lorain, OH (US); John Ward, Lorain, OH (US)

(73) Assignee: Jiffy International AS, Kristiansand (NO)

(*) Notice: Subject to any disclaimer, the term of this patent is extended or adjusted under 35 U.S.C. 154(b) by 419 days.

(21) Appl. No.: 16/480,208

(22) PCT Filed: Jan. 25, 2018

(86) PCT No.: PCT/US2018/015250
§ 371 (c)(1),
(2) Date: Jul. 23, 2019

(87) PCT Pub. No.: WO2018/140607
PCT Pub. Date: Aug. 2, 2018

(65) Prior Publication Data
US 2019/0364751 A1  Dec. 5, 2019

Related U.S. Application Data

(60) Provisional application No. 62/450,799, filed on Jan. 26, 2017.

(51) Int. Cl.
| | | |
|---|---|---|
| *A01G 24/22* | (2018.01) | |
| *A01G 24/12* | (2018.01) | |
| *A01G 24/28* | (2018.01) | |
| *A01N 25/04* | (2006.01) | |
| *A01N 25/30* | (2006.01) | |

(52) U.S. Cl.
CPC ............ *A01G 24/22* (2018.02); *A01G 24/12* (2018.02); *A01N 25/04* (2013.01); *A01N 25/30* (2013.01)

(58) Field of Classification Search
CPC ........ A01G 24/15; A01G 24/28; A01G 24/27; A01G 24/35; A01G 24/22; C05F 11/02; C05G 1/00; C05G 5/40
See application file for complete search history.

(56) References Cited

U.S. PATENT DOCUMENTS

| | | | |
|---|---|---|---|
| 4,357,402 A | 11/1982 | Sheibley et al. | |
| 4,425,165 A | 1/1984 | Bryhn et al. | |
| 5,698,001 A * | 12/1997 | Keenportz | C05D 9/00 71/24 |
| 6,302,936 B1 * | 10/2001 | Adam | C05F 3/00 71/13 |
| 6,360,478 B1 | 3/2002 | Spittle | |
| 8,544,207 B2 | 10/2013 | King et al. | |
| 2004/0011102 A1 * | 1/2004 | Sears | C05G 5/12 71/25 |
| 2006/0107590 A1 | 5/2006 | Kharazipour | |
| 2006/0112629 A1 | 6/2006 | Wright | |
| 2006/0117658 A1 * | 6/2006 | Holmenlund | A01G 31/02 47/79 |
| 2009/0076190 A1 | 3/2009 | Park | |
| 2010/0273006 A1 | 10/2010 | Rodrigues et al. | |
| 2013/0283485 A1 | 10/2013 | Harriman et al. | |
| 2015/0101378 A1 | 4/2015 | Ogle et al. | |
| 2016/0340582 A1 | 11/2016 | Krysiak et al. | |

FOREIGN PATENT DOCUMENTS

| | | | | |
|---|---|---|---|---|
| EP | 0147349 A1 | 7/1985 | | |
| EP | 0340763 A1 | 11/1989 | | |
| GB | 2246566 A * | 2/1992 | ............... | C05D 9/00 |
| WO | WO-2004037748 A1 * | 5/2004 | ........... | A01G 9/1086 |
| WO | 2004098270 A1 | 11/2004 | | |
| WO | 2009011905 A1 | 1/2009 | | |
| WO | 2012000063 A1 | 1/2012 | | |
| WO | 2016016407 A1 | 2/2016 | | |
| WO | 2017071823 A1 | 5/2017 | | |
| WO | 2017071825 A1 | 5/2017 | | |

OTHER PUBLICATIONS

Schmilewski (The role of peat in assuring the quality of growing media, Mires and Peat, vol. 3 (2008) (Year: 2008).*
PCT International Search Report and Written Opinion, Application No. PCT/US18/15250, dated Apr. 16, 2018.
Ashour, "Equilibrium Moisture Content for Some Natural Insulating Materials", Misr J. Ag. Eng., 2007, vol. 23, Issue 3, pp. 198-215.
Chen, "Chapter 2: Chemical Composition and Structure of Natural Lignocellulose", Biotechnology of Lignocellulose: Theory and Practice, Springer, 2014, XVIII, pp. 25-71.
The extended European search report, Application No. 18745177.8, dated Nov. 9, 2020.
European Communication pursuant to Article 94(3) EPC, Application No. 18745177.8, dated Feb. 22, 2023.

* cited by examiner

*Primary Examiner* — Johann R Richter
*Assistant Examiner* — Danielle Johnson
(74) *Attorney, Agent, or Firm* — MacMillan, Sobanski & Todd, LLC

(57) ABSTRACT

A plant growth media composition, articles made therefrom, and methods of making and using the same are described. The plant growth media composition includes a combination of one or more plant growth substrate materials and an additive such as cellulose fibers, clay, carrageenan, alginate, chitosan, or combinations thereof.

20 Claims, 20 Drawing Sheets
(20 of 20 Drawing Sheet(s) Filed in Color)

WOOD FIBERS FOR ENHANCED BINDING IN GROWING MEDIA

RELATED APPLICATIONS

This application claims priority to international application PCT/US18/15250, filed under the authority of the Patent Cooperation Treaty on Jan. 25, 2018, published; which claims priority to U.S. Provisional Application No. 62/450,799, filed under 35 U.S.C. § 111(b) on Jan. 26, 2017. The entire disclosure of each of the aforementioned applications is incorporated herein by reference for all purposes.

BACKGROUND OF THE INVENTION

Commercial polymer cross-linked substrate plugs, such as Preforma, Omni plugs, GrowTech, and IHT, have been made in factories based on polyurethane glue chemistry. However, these growing media need to be transported to nurseries, and the production processes often involve chemical emissions of polyurethane binders, such as toluene diisocyanate (TDI) and methylene diphenyl diisocyanate (MDI). Polyurethane binders are also not completely biodegradable. The transportation of premade growing media filled in trays adds extra costs for growers, and sometimes the short shelf life of such plugs may also cause logistic issues. Therefore, there is a need in the art for improved stabilized growing media for transplanting, so that growing media can be made upon need in situ, in nurseries, without the need for advanced production technology, and by using environmentally friendly and compostable additives/binders.

SUMMARY OF THE INVENTION

Provided is a stabilized growing media that holds together and may be used in transplanting robots or in nursery/greenhouses. Also provides are methods of making and using the stabilized growing media.

Provided is a plant growth media composition that includes a one or more plant growth substrate materials and a binder or additive such as cellulose fibers, clay, carrageenan, chitosan, alginate, or combinations thereof.

In a first aspect, provided is a plant growth media composition comprising cellulose fibers and one or more plant growth substrate materials. In certain embodiments, the composition comprises cellulose fibers, clay, and one or more plant growth substrate materials. In certain embodiments, the composition comprises cellulose fibers, carrageenan, and one or more plant growth substrate materials. In certain embodiments, the composition comprises cellulose fibers, one or both of alginate and chitosan, and one or more plant growth substrate materials.

In certain embodiments, the plant growth substrate materials comprise one or more of peat, coir, pine or other barks, perlite, compost, fertilizers, minerals such as vermiculite, manure, granulated lava, pumice, burnt or calcined clay, mineral fibers, Sphagnum moss, Hypnaceous moss, rice hulls, bagasse, sand, leaf mold, gypsum, and limestone. In certain embodiments, the substrate materials comprise fine white peat, perlite medium grade, and vermiculite fine grade. In certain embodiments, the substrate materials comprise coir, Spaghnum peat, and perlite. In certain embodiments, the substrate materials comprise fine peat and medium perlite.

In certain embodiments, the cellulose fibers are present in an amount ranging from about 0.1% w/w to about 40% w/w. In certain embodiments, the cellulose fibers are present in an amount ranging from about 1% w/w to about 20% w/w. In certain embodiments, the cellulose fibers are present in an amount ranging from about 5% w/w to about 10% w/w.

In certain embodiments, the cellulose fibers comprise a mixture of cellulose and lignocellulose. In certain embodiments, the cellulose fibers consist essentially of cellulose. In certain embodiments, the cellulose fibers consist essentially of lignocellulose.

In certain embodiments, the cellulose fibers have an average length that ranges from about 10 µm to about 5 mm, and an average width that ranges from about 1 µm to about 500 µm. In certain embodiments, the cellulose fibers have a density ranging from about 0.5 g/cm$^3$ to about 5 g/cm$^3$. In certain embodiments, the cellulose fibers have an equilibrium moisture content ranging from about 5% to about 15%. In certain embodiments, the cellulose fibers have a length-to-width ratio greater than about 10.

In certain embodiments, the plant growth media composition has a moisture content, before addition of water, of from about 35% to about 45%. In certain embodiments, the plant growth media composition further includes a sufficient amount of water to render the moisture content of the plant growth composition in a range of from about 65% to about 70%.

In certain embodiments, the plant growth media composition has a pH ranging from about 5.5 to about 6.8. In certain embodiments, the plant growth media composition has a pH of about 5.8. In certain embodiments, the plant growth media composition is in the form of expanded pellets, flat filled trays, mini blocks, or press pots.

In certain embodiments, the plant growth media composition further comprises a wetting agent. In certain embodiments, the plant growth media composition further comprises an additional binder selected from the group consisting of polyvinyl alcohol (PVA) and polyvinyl acetate (PVAC). In particular embodiments, the plant growth media composition further comprises a crosslinker. In particular embodiments, the crosslinker comprises an aldehyde, a thermo setting resin, or a salt of a multi-variant anion. In particular embodiments, the crosslinker comprises tripolyphosphate, citrate, glyoxal, isocyanate, or poly(acrylic acid) bis(hydroxyethyl) sulfone (BHES). In certain embodiments, the plant growth media composition further comprises a plasticizer selected from the group consisting of glycerol, phthalate esters, ethylene glycol, diethylene glycol, polyethylene glycols, propylene glycols, polypropylene glycols, 1,3-butylene glycol, 1,3-propanediol, urea, trimethylamine hydrochloride, pentanediol, block copolymers of polyoxypropylene, hexitols, and oxyalkylene derivatives of hexitols.

In certain embodiments where the composition comprises cellulose fibers and clay, the cellulose fibers and clay are present at a weight ratio of cellulose fibers to clay ranging from about 1:1 to about 5:1. In certain embodiments where the composition comprises cellulose fibers and clay, the clay is present in an amount ranging from about 10 kg/m$^3$ of substrate materials to about 65 kg/m$^3$ of substrate materials. In certain embodiments where the composition comprises cellulose fibers and clay, the clay is present in an amount ranging from about 35 kg/m$^3$ of substrate materials to about 40 kg/m$^3$ of substrate materials.

In another aspect, provided is a plant growth media composition comprising carrageenan and one or more plant growth substrate materials. In certain embodiments, the plant growth substrate materials comprise peat, coir, pine or other barks, perlite, compost, fertilizers, vermiculite, manure, granulated lava, pumice, burnt or calcined clay, mineral fibers, Sphagnum moss, Hypnaceous moss, rice hulls, bagasse, sand, leaf mold, gypsum, limestone, or a combination thereof. In certain embodiments, the carrageenan comprises kappa-carrageenan, lambda-carrageenan, iota-carrageenan, or a combination thereof. In certain embodiments, the carrageenan is present in an amount ranging from about 0.1% w/w to about 10% w/w, or from about 0.3% w/w to about 5% w/w, or from about 0.5% w/w to about 2% w/w. In certain embodiments, the composition further comprises alginate and/or chitosan. In certain embodiments, the composition further comprises a cross-linker comprises chitosan, calcium, tripolyphosphate, glutaraldehyde, adipic dihydrazide, water soluble carbodiimide, a metal, or combinations thereof. In certain embodiments, the composition includes carrageenan, cellulose fibers, and chitosan.

In another aspect, provided is a plant growth media composition comprising alginate, chitosan, or a combination thereof, and one or more plant growth substrate materials. In certain embodiments, the plant growth substrate materials comprise one or more of peat, coir, pine or other barks, perlite, compost, fertilizers, vermiculite, manure, granulated lava, pumice, burnt or calcined clay, mineral fibers, Sphagnum moss, Hypnaceous moss, rice hulls, bagasse, sand, leaf mold, gypsum, limestone, or a combination thereof. In certain embodiments, the chitosan is present in an amount ranging from about 0.1% w/w to about 10% w/w, or from about 0.3% w/w to about 5% w/w, or from about 0.5% w/w to about 2% w/w. In certain embodiments, the alginate is present in an amount ranging from about 0.1% w/w to about 10% w/w, or from about 0.3% w/w to about 5% w/w, or from about 0.5% w/w to about 2% w/w.

In another aspect, provided is a method of making a stabilized growing media, the method comprising mixing cellulose fibers with one or more plant growth substrate materials to form a fibrous mixture, configuring the fibrous mixture into a desired shape, and adding water to the fibrous mixture to activate binding in the fibrous mixture and form a stabilized growing media of the desired shape. In certain embodiments, the method further comprises allowing the stabilized growing media to dry for a period of time. In particular embodiments, the period of time ranges from about 30 minutes to about 24 hours. In particular embodiments, the period of time ranges from about 24 hours to about 36 hours. In certain embodiments, the one or more plant growth substrate materials comprise peat, coir, pine or other barks, perlite, compost, fertilizers, minerals such as vermiculite, manure, granulated lava, pumice, burnt or calcined clay, mineral fibers, Sphagnum moss, Hypnaceous moss, rice hulls, bagasse, sand, leaf mold, gypsum, and limestone. In certain embodiments, the configuring comprises filling plug molds in a tray with the fibrous mixture. In certain embodiments, the stabilized growing media is able to withstand mechanical transplanting processes.

In another aspect, provided is a method of making a stabilized growing media, the method comprising mixing carrageenan, chitosan, alginate, or a combination thereof with one or more plant growth substrate materials to form a fibrous mixture, configuring the fibrous mixture into a desired shape, and adding water to the fibrous mixture to activate binding of the fibrous mixture and produce a stabilized growing media of the desired shape. In certain embodiments, the method further comprises allowing the stabilized growing media to dry for a period of time. In particular embodiments, the period of time ranges from about 30 minutes to about 24 hours. In particular embodiments, the period of time ranges from about 24 hours to about 36 hours. In certain embodiments, the one or more plant growth substrate materials comprise peat, coir, pine or other barks, perlite, compost, fertilizers, minerals such as vermiculite, manure, granulated lava, pumice, burnt or calcined clay, mineral fibers, Sphagnum moss, Hypnaceous moss, rice hulls, bagasse, sand, leaf mold, gypsum, and limestone. In certain embodiments, the configuring comprises filling plug molds in a tray with the fibrous mixture. In certain embodiments, the stabilized growing media is able to withstand mechanical transplanting processes.

In another aspect, provided is a kit for making a stabilized growing media. The kit includes a first container housing a substrate mix, and a second container housing cellulose fibers, clay, carrageenan, alginate, chitosan, or a combination thereof. In certain embodiments, the kit further includes an additional binder or additive.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

FIG. 2A and FIG. 2C show plugs made with Jiffy Blend #3, while FIG. 2B shows plugs made with Jiffy Blend #10.

FIG. 9A shows the trays filled with plants, and FIG. 9B shows the plugs removed from the trays, with the roots of the plants visible.

DETAILED DESCRIPTION OF THE INVENTION

Figure 1A:
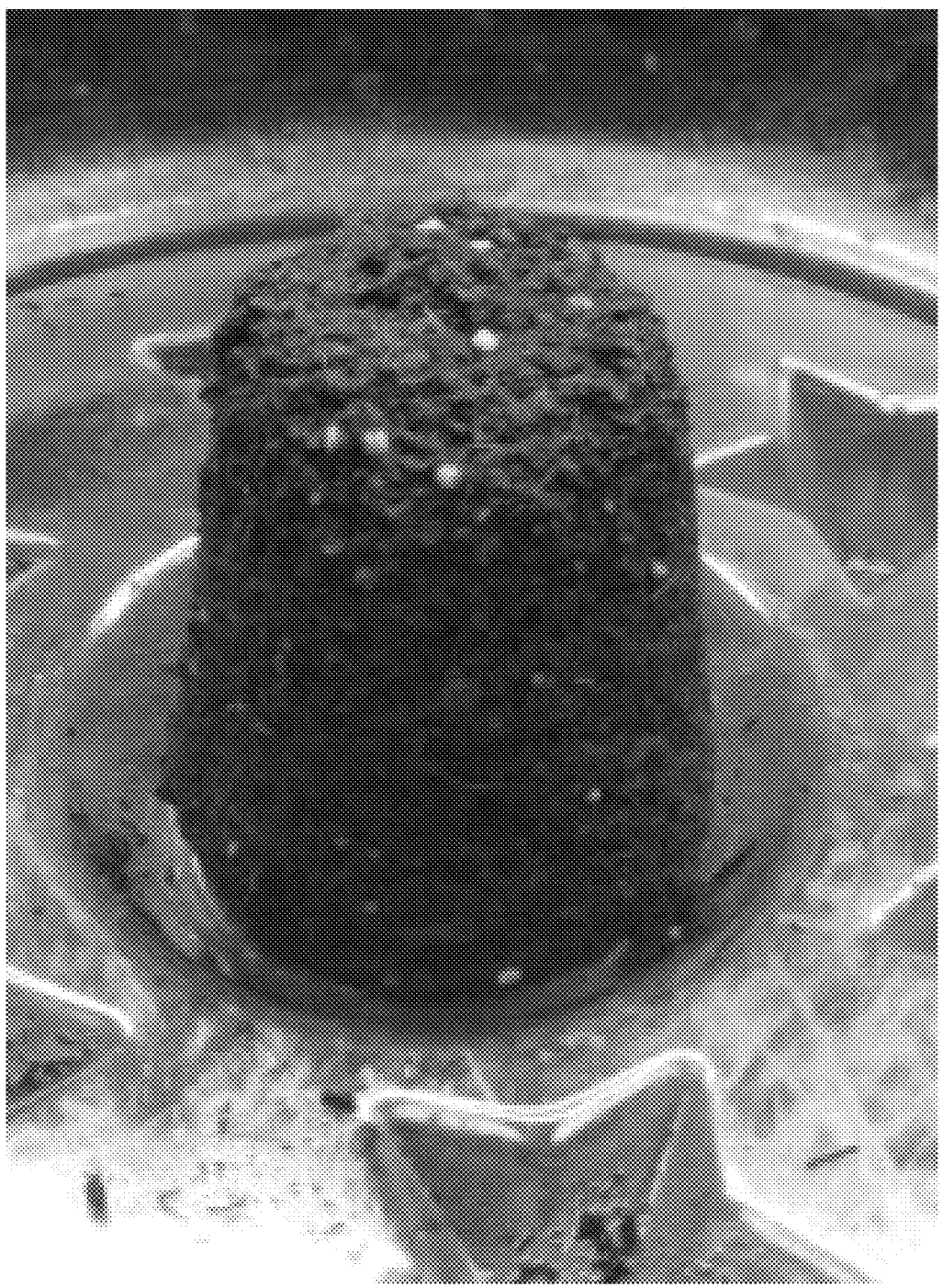
FIGS. 1A-1C: Photographs showing a test of plugs made with the cellulose fibers Arbocel® FT 400 (5% w/w) in Jiffy Blend #10. After 3 days with repeated watering, the plugs were still holding together nicely.

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

In accordance with the present disclosure, a plant growth material is prepared by combining one or more plant growth substrate materials with one or more binders or additives such as cellulose fibers, clay, carrageenan, alginate, and chitosan. The plant growth material may be further hydrated to produce a stabilized growing media. Using additives such as cellulose fibers, clay, carrageenan, alginate, and/or chitosan, different types of substrate plugs, press pots, pellets, and the like can be stabilized and made in nursery. The plugs have demonstrated improvements in physical and chemical characteristics, as well as in plant growth and toxicity tests, and have enabled surprisingly fast rooting of plants. Advantageously, the resulting material can be produced in situ in nurseries, as an alternative to factory-produced substrate-based plugs for plant growth.

In some embodiments, the plant growth material composition includes cellulose fibers and clay. It has been found that the combination of cellulose fibers and and clay works to provide cation exchange and improve water management while providing excellent strength and nutrient delivery to plants in growing media. Cellulose fibers add moisture, tensile strength, and porosity, which allows plant roots to intertwine better, while clay provides stabilization and cation exchange for more efficient nutrient delivery to the plant, with the overall combination providing improved water management by dispelling water more evenly. As demonstrated in the examples herein, and shown in FIG. 8, plant growth is enhanced in substrates comprising a combination of cellulose fibers and clay compared to substrates comprising cellulose fibers without clay, and substrates comprising a combination of cellulose fibers and clay stick together better over time than substrates comprising cellulose fibers without clay. Moreover, as demonstrated in the examples herein, substrates comprising cellulose fibes and clay strengthen in binding over time and repeated watering and drying cycles which simulate a greenhouse environment.

The substrate materials usable to make the plant growth media compositions include, but are not limited to: peat, coir, pine or other barks, perlite, compost, fertilizers, minerals such as vermiculite, manure, granulated lava, pumice, burnt or calcined clay, mineral fibers, Sphagnum moss, Hypnaceous moss, rice hulls, bagasse, sand, perlite, leaf mold, gypsum, limestone, and other growing media. A combination of two or more plant growth substrate materials is generally known as a substrate mix. Non-limiting examples of suitable commercially available substrate mixes include Jiffy Seedling Mix 17-1 (composed of white peat, perlite, and vermiculite), Jiffy 7 QSM (quick soil mix without netting), Jiffy Blend #3 (comprising coir and peat), Jiffy Blend #10 (70% coir, 26% spaghnum peat, 4% perlite), Jiffy Seedling Mix 17-3 (70% peat, 20% perlite, 10% vermiculite), and Jiffy Blend #30 (70% Canadian sphagnum peat, 20% coir, and 10% perlite).

The term "cellulose fibers" as used herein encompasses cellulose fibers, lignocellulose fibers, and mixtures of cellulose fibers and lignocellulose fibers, unless otherwise noted. Cellulose is a polysaccharide found in the cell wall of plants. Lignocellulose is a complex of cellulose, hemicellulose, and the aromatic polymer lignin. In some embodiments, the cellulose fibers consist of cellulose fibers. In some embodiments, the cellulose fibers consist of lignocellulose fibers. In some embodiments, the cellulose fibers comprise a mixture of cellulose fibers and lignocellulose fibers.

Cellulose and lignocellulose are obtainable from a wide variety of sustainable, plant-based raw materials. Natural cellulose fibers are already used in a wide variety of applications, including: for paper and board production; as an additive for tissue production; in the plastics industry for thermoplastics, WPC, duroplastics (melamine and phenolic resin molding compounds), and elastomers (rubber and rubber seals); in glues; in break pads; in floor coverings (e.g., laminates, rubber flooring); in enzyme production, such as in washing powder and animal feed; and in pore creators and stabilizers for technical ceramics. The cellulose fibers usable herein can include cellulose products in the form of functional cellulose fibers, cellulose additives, powdered cellulose, fine cellulose, micronized cellulose, cellulose compactates, cellulose flour, cellulose granulates, cellulose mixtures, cellulose compounds, cellulose derivatives, cellulosic ethanol (CE), methylcellulose (MC), hydroxypropyl methylcellulose (HPMC), cellulose gels, cellulose wadding, cellulose insulation materials, or mixtures thereof.

The term "fiber" conventionally refers to a particulate material wherein the length-to-width (or diameter) ratio of such particulate material is greater than about 10. However, it is understood that the cellulose fibers herein need not strictly adhere to this definition. The average length-to-width ratio of the cellulose fibers herein is typically greater than about 10, but, in some embodiments, the average length-to-width ratio of the cellulose fibers is less than 10. The cellulose fibers can have an average length that ranges from about 10 µm to about 5 mm, and an average width that ranges from about 1 µm to about 500 µm. In some embodiments, the cellulose fibers include softwood cellulose fibers that have an average width of about 35 µm. In some embodiments, the cellulose fibers include hardwood cellulose fibers that have an average width of about 18 µm. In some embodiments, the cellulose fibers have an average length ranging from about 1 cm to about 8 cm. In some embodiments, the cellulose fibers have an average length of about 2 mm.

The cellulose fibers can have a density ranging from about 0.5 g/cm$^3$ to about 5 g/cm$^3$. In one non-limiting example, the cellulose fibers have a density of about 1.5 g/cm$^3$. The equilibrium moisture content of the cellulose fibers can range from about 5% to about 15%, or from about 8% to about 12%. In one non-limiting example, the equilibrium moisture content of the cellulose fibers is about 10%.

In some embodiments, the cellulose fibers are organic fibers produced from the chemical disintegration of fir and beech woods. However, numerous other methods of producing suitable cellulose fibers are encompassed by the present disclosure. In some embodiments, the cellulose fibers are physiologically and toxilogically harmless.

Non-limiting examples of suitable cellulose fibers include those commercially available under the Arbocel® brand name, such as Arbocel® 400, FI 400, FIF 400, FT 400, and H1000, as well as those under the Lignocel® brand name such as Lignocel CO 3-6. Arbocel® is an all-cellulose material. Arbocel® fibers have increased caliper/bulk, and improved formation and profile, enlarged stiffness, and increased porosity compared to other cellulose fiber products. Arbocel® is a non-toxic, biodegradable organic binder system with no dangerous emissions or other environmental concerns. All of the ingredients in the Arbocel® material are used safely in the food or pharmaceutical industries. The Arbocel® material can be added as a solid additive to the substrate materials. However, though Arbocel® and Lignocel® materials are identified for exemplary purposes, other cellulose fiber products can be used, including cellulose fiber products that are more water soluble than Arbocel® or Lignocel® and therefore can be added to the substrate materials in the form of a suspension or emulsion.

As noted, the combination of cellulose fibers and clay produces surprisingly advantageous results. A wide variety of clays may be used as an extra binder, but also to provide cation exchange capacity, making the resulting media more efficient in delivering nutrients to plants. In some embodiments, the clay is a bentonite clay, which is an absorbent aluminum phyllosillicate clay containing silicates and elemental oxides. Bentonite clay principally comprises the clay material montmorillonite. However, other clays can also be used. Non-limiting examples of other suitable clays include hectorite clays, leonardite clays, and smectite clays. One non-limiting of a suitable clay that is commercially available is clay sold under the brand name Pelbon from AMCOL BioAg. Pelbon clay is a calcium bentonite that contains minor amounts of quartz, feldspar, and mica. Pelbon clay typically contains 60.5% $SiO_2$, 18.2% $Al_2O_3$, 5.25% $Fe_2O_3$, 3.26% MgO, 3.14% CaO, 0.20% $Na_2O$, 0.14% $K_2O$, and 4.85% LOI.

In general, the cellulose fibers are added to the substrate materials to be present in the fibrous mixture in an amount ranging from about 0.1% to about 40% (w/w), or from about 1% to about 20% (w/w), or from about 5% to about 10% (w/w), based on the total weight of the fibrous mixture (before any water is added). When clay is present, the clay is added to the substrate materials and cellulose fibers to be present in the fibrous mixture in an amount ranging from about 10 $kg/m^3$ of substrate to about 65 $kg/m^3$ of substrate, or from about 25 $kg/m^3$ of substrate to about 50 $kg/m^3$ of substrate, or from about 35 $kg/m^3$ of substrate to about 40 $kg/m^3$ of substrate.

The cellulose fibers and clay may be present in the fibrous mixture in a weight ratio of cellulose fibers to clay of from about 0.25:1 to about 10:1, or from about 0.75:1 to about 7:1, or from about 1:1 to about 5:1. The optimal ratio of cellulose fibers to clay may depend on the particular combination of substrate materials in the composition.

The plant growth media composition may include one or more carrageenans. Carrageenan is a family of linear sulfated polysaccharides extracted from red edible seaweeds. Carrageenans are widely used in the food industry for their gelling, thickening, and stabilizing properties, including in dairy and meat products, due to their strong binding of food proteins. There are three main varieties of carrageenan, which differ in their degree of sulfation. Kappa-carrageenan has one sulfate group per disaccharide, iota-carrageenan has two sulfate groups per disaccharide, and lambda-carrageenan has three sulfate groups per disaccharide. The carrageenan may be added to the composition in an amount ranging from about 0.1% w/w to about 10% w/w, or from about 0.3% w/w to about 5% w/w, or from about 0.5% w/w to about 2% w/w.

In some embodiments, the plant growth media composition comprises a combination of cellulose fibers and carrageenan. As demonstrated in the examples herein, it has been found that plugs made with a combination of cellulose fibers and carrageenan strengthen over repeated watering and drying cycles that simulate a greenhouse environment. In one non-limiting example, the plant growth media composition comprises substrate materials, cellulose fiber in an amount of from about 0.5% w/w to about 2% w/w, and carrageenan in an amount of from about 0.5% w/w to about 2% w/w.

The plant growth media composition may include one or more biopolymers such as, but not limited to, chitosan or alginate. As shown in the examples herein, chitosan and alginate help to strengthen the composition. Chitosan and/or alginate may be present in an amounts, individually or combined, ranging from about 0.1% w/w to about 10% w/w, or from about 0.3% w/w to about 5% w/w, or from about 0.5% w/w to about 2% w/w.

In one non-limiting example, the plant growth media composition comprises substrate materials, cellulose fibers in an amount ranging from about 0.5% w/w to about 2% w/w, carrageenan in an amount ranging from about 0.5% w/w to about 2% w/w, and chitosan in an amount ranging from about 0.% w/w to about 2% w/w. In another non-limiting example, the plant growth media composition comprises substrate materials, carrageenan in an amount ranging from about 0.5% w/w to about 2% w/w, and chitosan in an amount ranging from about 0.% w/w to about 2% w/w.

In another non-limiting example, the plant growth media composition comprises substrate materials, cellulose fibers in an amount of about 2% w/w, and carrageenan in an amount of about 2% w/w. As shown in the examples herein, it is has been found that the combination of cellulose fibers and carrageenan can produce a plant growth media composition which dramatically increases in strength over time in a greenhouse environment (i.e., following repeated cycles of watering and drying).

In another non-limiting example, the plant growth media composition comprises substrate materials, cellulose fibers in an amount of about 1% w/w, carrageenan in an amount of about 1% w/w, and chitosan in an amount of about 1% w/w. This combination has been found to produce a plant growth media composition which significantly increases in strength over time, and contains less additive by weight than the combination of 2% cellulose fibers and 2% carrageenan. In other embodiments, the plant growth media composition comprises substrate materials, cellulose fibers in an amount of about 1% w/w, carrageenan in an amount of about 0.5% w/w, and chitosan in an amount of about 0.5% w/w. This combination results in a significant increase in strength over time, though not as significant as the combination of substrate materials, 1% w/w cellulose fibers, 1% w/w carrageenan, and 1% w/w chitosan.

In another non-limiting example, the plant growth media composition comprises substrate materials, 1% w/w carrageenan, and 1% w/w chitosan. This combination has been found to produce a plant growth media composition which significantly increases in strength over time, and does not contain cellulose fibers. Moreover, this combination includes even less additive by weight than other combinations which produce strengthening compositions.

As shown in the examples herein, a plant growth media composition which comprises substrate materials and 2% w/w cellulose fibers, without other additives, results in only a slight increase in strength over time.

The additives, such as cellulose fibers, a combination of cellulose fibers and clay, alginate, chitosan, carrageenan, or combinations thereof, can be used for making stabilized growing media for final products such as substrate mixes, plugs, pre-compressed peat pellets, and the like. The term "substrate" may be used herein to refer to any such end product. The stabilized growing media can be prepared by first combining one or more substrate materials (e.g., a commercially available substrate mix) with cellulose fibers, or with cellulose fibers and clay, or with other additives or combinations thereof described herein, to produce a fibrous mixture. The fibrous mixture can then be used to form pellets, plugs, pots, mini blocks, or the like by adding the fibrous mixture to the desired mold (e.g., a tray having cavities for producing blocks or pressing pots), though this shaping step is not necessary if the desired product is a stabilized substrate mix instead of a product having a defined shape such as a plug.

The substrate materials and additives are mixed together with a high shear speed. A high shear speed is important for optimal binding and homogeneous mixing. A standard hand-held kitchen mixer is suitable for providing a high shear speed, though other methods of mixing with a high shear speed are encompassed within the present disclosure. Moreover, high shear mixing is not strictly necessary, and compositions which have not been mixed at a high shear speed are nonetheless encompassed within the present disclosure.

Once the fibrous mixture is adequately mixed together, the fibrous mixture is optionally compressed. For example, the fibrous mixture can be made into compressed pellets. Compression enhances the binding of the fibrous mixture. The compressed fibrous mixture is useful for do-it-yourself substrate plugs, where the end user simply fills a tray with the fibrous mixture and then adds water to produce a plug. It has been found that the fibrous mixtures described herein get stronger over time and repeated watering cycles, and therefore are highly desirable for do-it-yourself plug applications, which provide flexibility for greenhouse users.

The fibrous mixture generally has an initial (i.e., before additional water is added) moisture content ranging from about 20% to about 60%, or from about 30% to about 50%, or from about 35% to about 45%, based on the total weight of the fibrous mixture. In one non-limiting example, the fibrous mixture has an initial moisture content of about 40%, based on the total weight of the fibrous mixture.

Once the fibrous mixture is in the desired shape or form, water is generally added to the fibrous mixture to activate binding in the fibrous mixture and produce a stabilized growing media. The water may or may not be heated. In some embodiments, water is added to the point of saturation, where water precipitates. Preferably, water is added until the point of 'stickiness', which is typically when the mixture has a moisture content ranging from about 55% to about 80%, or from about 60% to about 75%, or from about 65% to about 70%. However, different amounts of water can be added based on the desired physical characteristics of the final product. Moreover, the skilled practitioner will recognize that the optimal moisture content of the fibrous mixture before and after adding the water will depend on the compositions and amounts of the substrate materials and additives included in the fibrous mixture. Following the addition of water, the mixture is allowed to dry for a short period of time, generally ranging from about 30 minutes to about 2 hours. After drying, the resulting product is a stabilized growing media in the desired form or shape. The use of additives such as cellulose fibers, a combination of cellulose fibers and clay, carrageenan, a combination of cellulose fibers and carrageenan, chitosan and/or alginate, or a combination of cellulose fibers and chitosan and/or alginate, as described results in a stabilized growth media having advantageous binding properties. For instance, as demonstrated in the examples here, the stabilized growth media gains strength over time over repeated watering cycles which mimic greenhouse conditions.

For clarity, the term "stabilized growing media" is used herein to refer to the stabilized product, which is distinguishable from the fibrous mixture. The term "fibrous mixture" is used to refer to the product resulting from the combination of additives/binders with one or more substrate materials, before addition of water to activate binding. For clarity, it is noted that the term "fibrous mixture" is used herein to encompass the mixture produced from substrate materials and additives/binders even if the mixture does not include cellulose fibers. The term "stabilized growing media" is used herein to refer to the product resulting from the addition of water to the fibrous mixture to activate binding therein. The term "plant growth media composition" is used herein to refer to either the fibrous mixture or the stabilized growing media.

The conductivity (EC) and acidity (pH) are two commonly measured characteristics of a substrate. The pH of the stabilized growing media described herein generally ranges from about 5.5 to about 7.0, or from about 6.0 to about 6.8, or from about 6.2 to about 6.6. The conductivity of the stabilized growing media described herein generally ranges from about 0.2 mS/cm to about 0.8 mS/cm. In one non-limiting example, the stabilized growing media has a pH of about 5.8, and a conductivity of about 0.5 mS/cm. Both the pH and the conductivity of the stabilized growing media, or the fibrous mixture, are adjustable upon addition of suitable buffers or fertilizer ions.

In addition the various additives discussed above, the plant growth media composition provided herein may further include one more additional binders, such as the polymeric binders polyvinyl alcohol (PVA) or polyvinyl acetate (PVAC). The plant growth media composition may also include a variety of optional additives. These additional binders and additives can be added to the fibrous mixture or may be present in the substrate materials before combining with the additives such as cellulose fibers. When a polymer is present, a crosslinker can be added to improve the strength of the media. The crosslinkers help stabilize the plant growth media composition when a polymer is present.

Suitable crosslinkers for PVA include, but are not limited to, tripolyphosphate, citric acid, glyoxal, dimethylol dihydroxy ethylene urea (DMDHEU), aldehydes, thermo setting resins, salts of multi-variant anions, glyoxal, isocyanate, poly(acrylic acid), bis(hyudroxyethyl) sulfone (BHES), glutaraldehyde, succinic acid, butane tetracarboxylic acid, alumina, epichlorohydrin, borax, aluminum hydroxide, hydrated aluminum chloride, aluminum acetate, aluminum sulfate, glycine, malic acid, tartaric acid, oxalic acid, dialdehydes, polyaldehydes, epoxides, triphosphates, divinyl sulphone, thiol reagents, and C2 to C9 polycarboxylic acids. Non-limiting examples of commercially available crosslinkers include Bacote –20 (Magnesium Elekton, Ltd), Glyoxal (BASF), and Polycup 172 (Ashland). The crosslinkers can be used alone or as a part of a mixture of crosslinkers. In some embodiments, the crosslinker is pre-mixed with PVA prior to being added to the substrate materials, to the fibrous mixture, or to the stabilized growing media. Pre-mixing the crosslinker and PVA speeds up the reaction.

Suitable crosslinkers for carrageenan, chitosan, or alginate include, but are not limited to, chitosan (which has hydroxyl groups capable of crosslinking to form, e.g., esters with carboxylic acid groups), calcium, glutaraldehyde, metals, adipic dihydrazide, water soluble carbodiimide, or combinations thereof. In some embodiments, the crosslinker is pre-mixed with carrageenan, chitosan, and/or alginate prior to being added to the substrate materials, to the fibrous mixture, or to the stabilized growing media.

In one non-limiting example, the plant growth media composition comprises substrate materials, cellulose fibers in an amount ranging from about 0.5% w/w to about 2% w/w, carrageenan in an amount ranging from about 0.5% w/w to about 2% w/w, chitosan in an amount ranging from about 0.5% w/w to about 2% w/w, and tripolyphosphate in an amount ranging from about 0.5% w/w to about 2% w/w.

Further, one or more accelerators can be added to the substrate materials, to the fibrous mixture, to the stabilized growing media in order to benefit the crosslinking process. Suitable accelerators include, but are not limited to, sodium hypophosphite. The accelerator, when used, is typically added in an amount of about 1-10% relative to the amount of crosslinker present. For example, if the crosslinker is citric acid at 2%, then 0.2% sodium hypophosphite can be added as an accelerator.

The terms "polyvinyl alcohol" and "PVA" refer to a water-soluble synthetic polymer having the general formula $[CH_2CH(OH)]_n$. PVA may be supplied as a solid or as an aqueous solution. In particular embodiments, PVA is provided as a superfine grade solid having 99% purity. (When PVA is used as a solid, it can optionally be heated for a period of time in order to aid dissolution of the PVA in water.) PVA can be manufactured from hydrolysis of polyvinyl acetate. PVA can be fully hydrolyzed (all —OH groups), but may also be only partly hydrolyzed (e.g., 85-90% —OH groups) with, for example, 10-15% acetate groups. Suitable examples of commercially available PVA include, but are not limited to: Selvol 165SF (Sekisui), which has a viscosity of 62-72 cps (high molecular weight); Selvol E575 (Sekisui), which has a molecular weight between 180,000-215,000; Selvol 350 (Sekisui), which has a viscosity of 62-72 cps and a molecular weight between 172,000-186,000; Selvol 707 (Sekisui); and Selvol 605 (Sekisui). Premade solutions of PVA may be purchased from various companies. Such solutions with high molecular weight or a high degree of polymerization are desired to give added strength. Examples from Sekisui are Selvol 125 (8% w/v solution), Selvol 325 (9% w/v solution), Selvol 523 (9% w/v solution), and Selvol 540 (5% w/v solution). Alternatively, PVA can be added as a solid additive.

PVA can be made as a solution (for example, 2-5%) before being added, since the solubility of PVA requires stirring and heating to 90° C. for some time to make sure that the chemical is completely dissolved. The solution can then be added to the substrate materials, or to the fibrous mixture, or to the stabilized growing media. For convenience, PVA solutions or PVA emulsions can also be purchased as premade solutions/emulsions.

The terms "polyvinyl acetate" and "PVAC" refer to an aliphatic polymer having the general formula $[C_4H_6O_2]_n$. PVAC generally has a white color, is insoluble in water, and is sold as an emulsion. Suitable examples of commercially available PVAC include, but are not limited to: VA710 emulsion, which is 50% solids per liter; Aquence LA 0276 emulsions (Henkel); DARATAK® 56L (Owensboro Specialty Polymers, Inc.), which is a very high molecular weight PVAC polymer with a low emulsion viscosity and good tensile strength; and Duracet 300 (Franklin Adhesives & Polymers), which is a PVAC with high molecular weight.

PVA can be made from PVAC by the use of NaOH/Methanol. PVAC has a white color, while PVA is a transparent solution. PVAC is insoluble in water and is sold as an emulsion, while PVA is 100% soluble in water. PVA may be fully hydrolysed (all —OH group), but may also be partly hydrolysed (85-90% OH-groups and 10-15% acetate groups). Thus, PVAC is more hydrophobic and contributes stronger to produce drier surfaces than PVA. The strength of the polymer is dependent on the degree of polymerization; longer polymers or higher molecular weights give stronger products. A PVAC emulsion can be added to the substrate materials, or to the fibrous mixture, or to the stabilized growing media.

In one embodiment, the PVAC is Aquence LA 0276. However, other types of PVAC emulsions may be used, such as: PVAC Emulsions like Duracet 300 from Franklin Adhesives & Polymers, and Daratak 56 L from Owensboro Specialty Polymers.

The additional binder can also include a foam. PVA foam or PVAC foam may be made in the laboratory by mixing, for example, 1% (w/v) solution of PVAC with shaving foam (soap) in a ratio of 1:1. PVA foam can also be prepared by whipping PVA vigourously. In one non-limiting example of preparing and using PVA foam from whipping, 100 ml 5% (w/v) Sekisui 540 PVA and 8% (per weight PVA) crosslinker (citric acid) are whipped in a mixing bowl with a typical kitchen hand mixer. Once the solution is completely foamed, the foam can be added to the substrate materials or to the fibrous mixture, and then mixed until a "creamy" texture is obtained. The resulting slurry can then be used to fill a conventional plant propagation tray.

PVA foam may also be purchased from Makura BV in the Netherlands. PVA foam or PVAC foam is commercially available as a bonding agent for gluing paper and wood. For example, Makura B.V. sells foam solutions under the trademark Makutech®. The Makutech® foam PVA glue, from Makura BV, looks and feels like a shaving cream, is strong and sturdy, and has limited penetration into the materials. This also results in less moisture in the final product. Makutech® PVA foam has the same environmental and fire behavior as unmodified non-foamable PVA. Combining this type of PVA foam with suitable cross linkers, like citric acid, results in faster kinetics and reaction time. Non-limiting examples of other specific commercially available PVA foams from Makutech® include SA 300 (specified modified PVA glue), and silica foams such as SI 300, SI 500, or SI 600. When PVA foam is used, the resulting growing media product is more airy and lighter in weight.

Other possible additives include plasticizers including, but not limited to: glycerol, phthalate esters, ethylene glycol, diethylene glycol, polyethylene glycols, propylene glycols, polypropylene glycols, 1,3-butylene glycol, 1,3-propanediol, urea, trimethylamine hydrochloride, pentanediol, block copolymers of polyoxypropylene, hexitols, and oxyalkylene derivatives of hexitols. The plant growth media composition may also include additives such as pH buffers, expanded polystyrene, urea formaldehydes, and microelements (e.g., iron, manganese, zinc, copper, boron, molybdenum, chloride, and nickel).

It is understood that the present disclosure can be embodied as part of a kit or kits. A non-limiting example of such a kit comprises a substrate mix and cellulose fibers, clay, carrageenan, chitosan, alginate, or a combination thereof, in separate containers, where the containers may or may not be present in a combined configuration. Many other kits are possible, such as kits further comprising an additional binder or other additive in additional containers. The kits may further include instructions for using the components of the kit to practice the subject methods. The instructions for practicing the subject methods are generally recorded on a suitable recording medium. For example, the instructions may be present in the kits as a package insert or in the labeling of the container of the kit or components thereof. In other embodiments, the instructions are present as an electronic storage data file present on a suitable computer readable storage medium, such as a flash drive, CD-ROM, or diskette. In other embodiments, the actual instructions are not present in the kit, but means for obtaining the instructions from a remote source, such as via the internet, are provided. An example of this embodiment is a kit that includes a web address where the instructions can be viewed and/or from which the instructions can be downloaded. As with the instructions, this means for obtaining the instructions is recorded on a suitable substrate.

Furthermore, the present disclosure can be embodied as pre-filled containers, such as trays or pots, ready for seed planting. In some embodiments, trays having cavities containing plugs composed of the stabilized growing media as described herein are provided. In other embodiments, pots (such as, but not limited to, biodegradable pots) filled with the stabilized growing media are provided. It is understood that any suitable container can be at least partially filled with the stabilized growing media and such a container is entiretly within the scope of the present disclosure.

EXAMPLES

Example I

Materials and Methods

Polyvinyl alcohol (PVA) was purchased from Sekisui (Kentucky, USA; trade name—Selvol; superfine grade—99% purity). ARBOCEL® 400, FI 400, FIF 400, FT 400, and LIGNOCEL CO 3-6 (all long fibers with less risk of molding) were provided by J. Rettenmaier & Söhne (Rosenberg, Germany). Likewise, Lignocel PF (water retention), and Lignocel Flakes (for orchards) were provided by J. Rettenmaier (Rosenberg, Germany).

The plant substrate mix carrying the trade name Jiffy Seedling Mix #17-1 was from Jiffy Products America (Lorain, OH). It was composed of 70% fine white peat, 20% perlite medium grade, and 10% vermiculite fine grade, in addition to lime, fertilizer, and wetting agent. To the 17-1 substrate mix was added 0.26 liters of the wetting agent Conductor (Aquatrols Inc., Paulsboro, NJ) per m$^3$ mix. The pH was specified to be pH 5.8±0.3 and the EC was specified to be 0.5±0.3 mS/cm. The pH was control measured to be 5.86. pH measurements of substrate mixes of plugs were taken by a dilution method, for example by diluting a fixed amount of substrate in a certain volume of water and measuring the pH in the water. Typically, a 1:1.5 volume suspension of the substrate in demineralized water for 18 hours was used.

The Jiffy Blend #10 coir mix was composed of 70% coir, 26% Spaghnum peat, and 4% perlite. The Jiffy Blend #3 mix was composed of 90% fine peat and 10% medium perlite.

A mix of plant substrates with chemicals was made by adding, for example, 10 g solid Arbocel® FT400 or 20 g solid Arbocel® FT400, to 100 g of either Jiffy Blend #10 or Jiffy Blend #3 substrate mix, making substrate mixes with 10% (w/w) or 20% (w/w) Arbocel, respectively. The fibrous mixtures containing Arbocel and substrate materials had 65.9% moisture content (MC). For making samples for texture analysis, the fibrous mixtures were added to a square frame, compressed, and prepared for irrigation. The squares were measured on load/tensile strength. After filling, the load squares were matured for 24-96 hours, typically 48 hours, at room temperature (21° C.). Temperature was measured with a Digital Thermometer Testo 110 from Testo, Inc. (Sparta, NJ).

For making plugs for transplanting and plant growth experiments, the cellulose fibers were mixed into the substrate materials as detailed above, and the resulting fibrous mixtures were used to fill the square cavities. A 338-count injected molded tray was used. Each cavity contained 20 cc. Water heated to specified temperatures was then added to the mix until complete saturation occurred. The material was set for 48 hours, and the cavities were tested in plant growth.

pH and EC Measurement

The conductivity of the substrate gives an indication about the nutritional level. An EC meter (Seven Easy EC Meter from Mettler-Toledo, LLC, Columbus, OH) was used to measure the conductivity. The acidity of the substrate was determined potentiometrically using an electronic pH meter (Seven Go pH meter from Mettler-Toledo, LLC, Columbus, OH). Both EC and pH were determined using one and the same 1:1.5 volume suspension of the substrate in de-mineralized water.

Breaking Point Measurement Using a Texture Analyzer

Breaking strength is the greatest stress, especially in tension, that a material is capable of withstanding without rupture. Tensile strength is the maximum stress that a material can withstand while being stretched or pulled before failing or breaking. Breaking force in Newtons was recorded over time/distance at 20-22° C. A Lloyd Instruments LF-plus single column universal testing machine from Lloyd Materials Testing (Bognor Regis, UK) was used to measure the load/breaking strength of the substrate blocks treated with the PVA/CA and other compounds. Microprocessed control for highly accurate load measurement and rapid data acquisition was implemented, including a highly accurate load cell that is for tension, compression, and cycling through zero force measurements. Load was measured in Newtons against machine extension in millimeters (mm).

Plant Growth

Efficacy was tested by germinating and growing tomato plants in the stabilized growing media. Two tomato seeds (of 'Beef Stake') were placed in individual cells filled with fibrous mixture, irrigated, and placed into a germination compartment. For vegetative propagation like Geraniums, a 2 node length individual cutting was placed in the appropriate fibrous mixture. A propagation tray was then placed in a tray and a tight cover simulating a greenhouse environment was utilized. To reduce the evapotranspiration rate, manual misting applications of water were applied 4-5 times daily. Typically, root initiation at the base occurs in 7-10 days. Germination was determined and noted by visual inspection, when plant radicals were seen emerging from underneath substrate. After germination, the cover of the compartment was removed and plants were treated with 12 hours of supplemental lighting (6400 K wavelength) and typical irrigation and nutrient solutions at 20-22° C. After 14-21 days, both the vegetative and root portions of the individual plants were evaluated for any stress-related factors that would affect normal growth.

Results and Discussion

Figure 1B:
Figure 1C:
Figure 2A:
FIGS. 2A-2C: Photographs showing test of plugs made with the cellulose fibers Arbocel® FT 400 at 5% w/w (FIG. 2A), 10% w/w (FIG. 2B), and 20% w/w (FIG. 2C) on Jiffy Blend #3 and Jiffy Blend #10 high coir percentage.
Figure 2B:
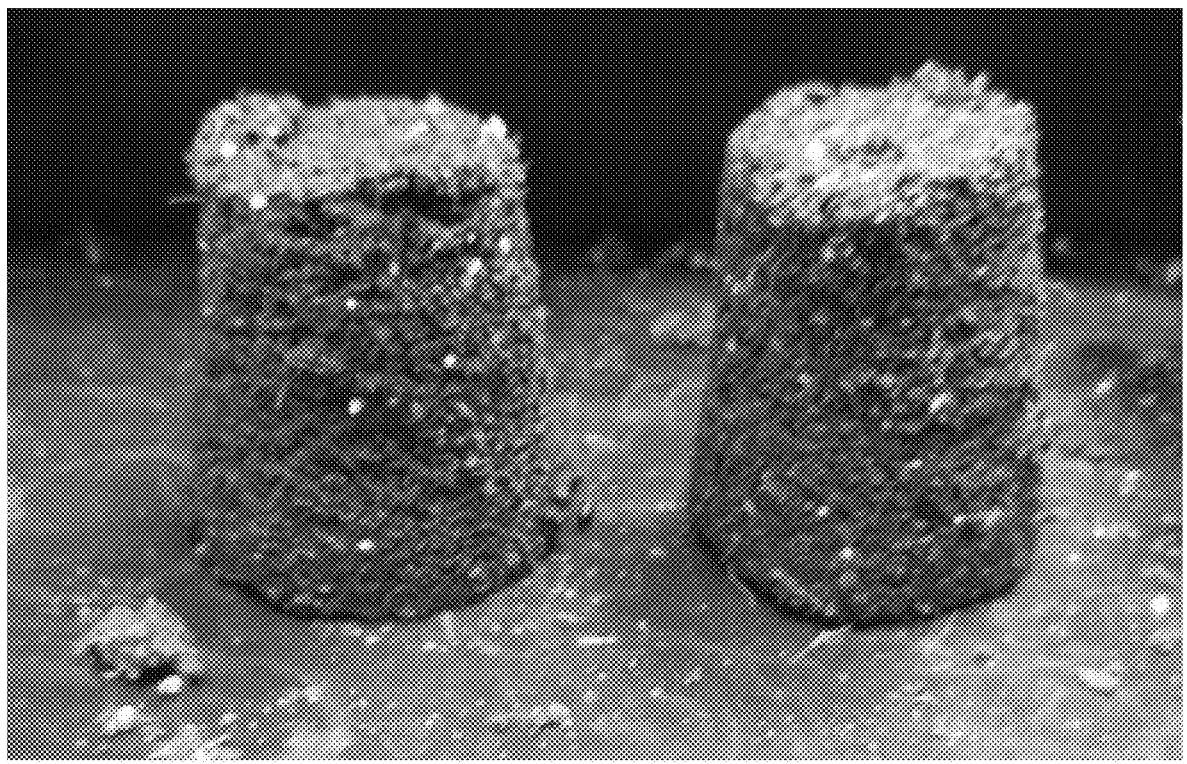
Figure 2C:

Plant plugs were made in situ with Arbocel® FT 400 (FIGS. 1-2). The plugs were made by adding 200 grams of substrate materials to 300 ml of water, and then adding the volume of 5% Arbocel. This produced coherent and rather strong elastic plant plugs.

Load Testing with Texture Analyzer

Testing with Soid Arbocel Mixed into Substrate

Different blocks with solid Arbocel and substrate materials were manufactured and tested in break point measurement. Technically this is force/breakpoint measurements, but a tensile property can be observed with strength factor over distance.

Making Press Pots

Cellulose fibers (Arbocel) were added to the Preforma Blend #3. A parallel production with PVA/Citric acid was also made. Water was added to these fibrous mixtures (initial moisture content about 40%) until the point of 'stickiness' texture, having a moisture content of about 65-70%. The mixes were then manually pressed to square press pots with a manual press pot maker. The press was pushed into the mix in a container and punched out, releasing mini blocks. The blocks were light and gained strength as they sat over time. The blocks held together very nicely after a very short resting time. The blocks were sowed with lettuce, cress, tomato, or basil.

The weight of the Arbocel or PVA blocks was compared to that of clay blocks. An average of 6 blocks from each series shows that the clay blocks are 9.3% more in weight than the PVA. This is based on using 200 g of Jiffy Blend #3 substrate material. Tomatoes were seeded in all 3 sets for germination and growth tests.

Shrinkage Test 10 press pots were made and compacted into a row. The length of each press pot was measured when freshly made, and then again after a period of time, for example 1-2 weeks, when the pots were dry. These measurements showed that there may only be 1 cm of shrinkage for 10 blocks, measuring the total length of a 'road length' made of 10-25 blocks.

Rooting

Figure 3:
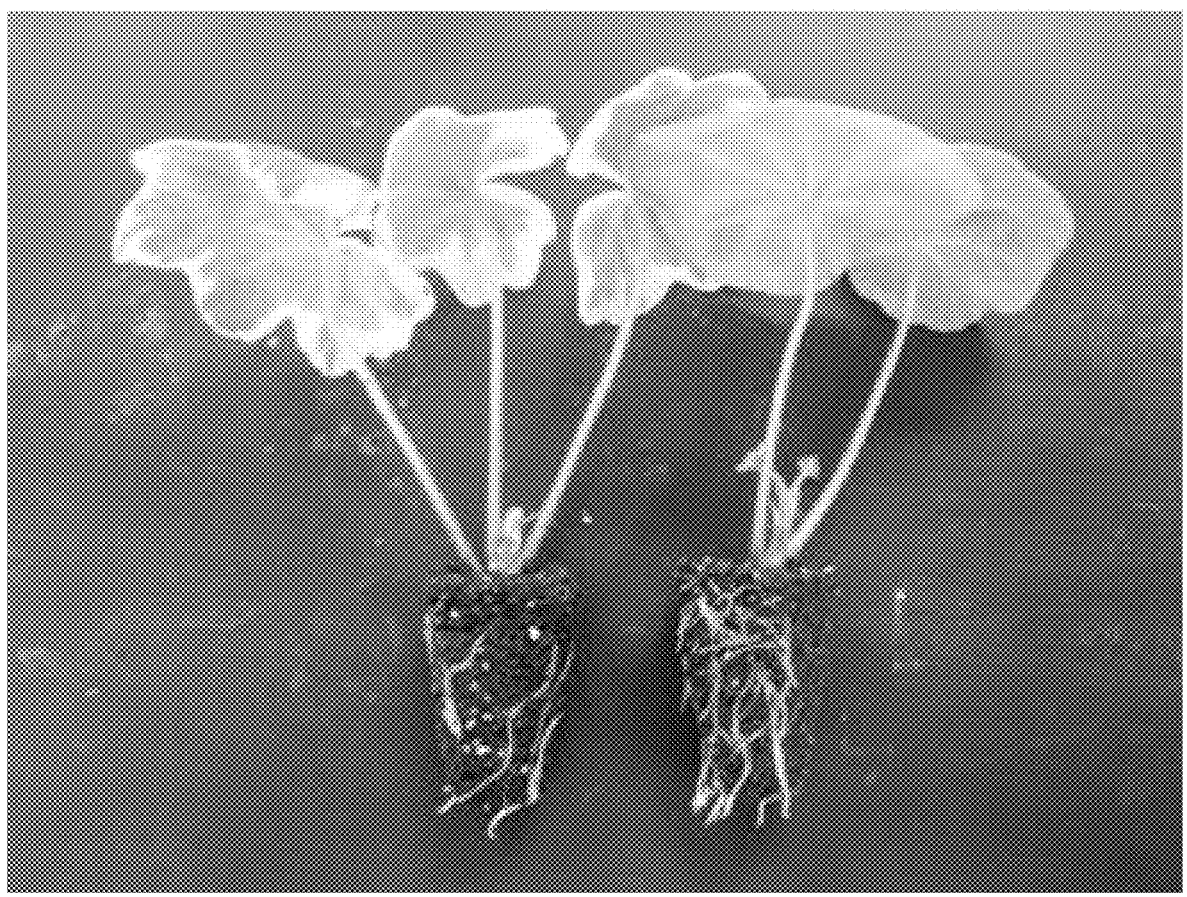
FIG. 3: Photograph of vegetative geranium cuttings showing extension root development in the substrate 8 days after "sticking" un-rooting cuttings.

Arbocel® powdered cellulose FT 400 (10% per weight) was added to the substrate Jiffy Blend #3. The fibrous mixture was blended and then filled into a traditional horticultural propagation growing tray. Water was added to the fibrous mixture, in which the material then provided structural stability. Planted cuttings were then placed into a mini lab greenhouse where traditional growing conditions were applied. FIG. 3 shows a photograph of vegetative geranium cuttings showing extension root development in the substrate 8 days after initiation (or "sticking" un-rooting cuttings). Typically, this extension root development requires a longer period, generally 10-14 days, depending on greenhouse conditions. Thus, the stabilized growing media resulted in surprisingly fast rooting.

Summary

Arbocel is not water soluble and cannot be washed out of the plug. The binding to growing media does not depend on excessive heating, and the binders can be added to different types of growing media such as horticultural mixes filled in tray cavities/cells, systems for making press pots, expansions of quick soil mixes (QSMs)—precompressed peat or coir squares and plates, and of netless pellets systems. Many of these applications are suitable for vegetable growing. These compositions result in such stabilized media that they may be planted directly in the field.

Example II

Figure 4A:
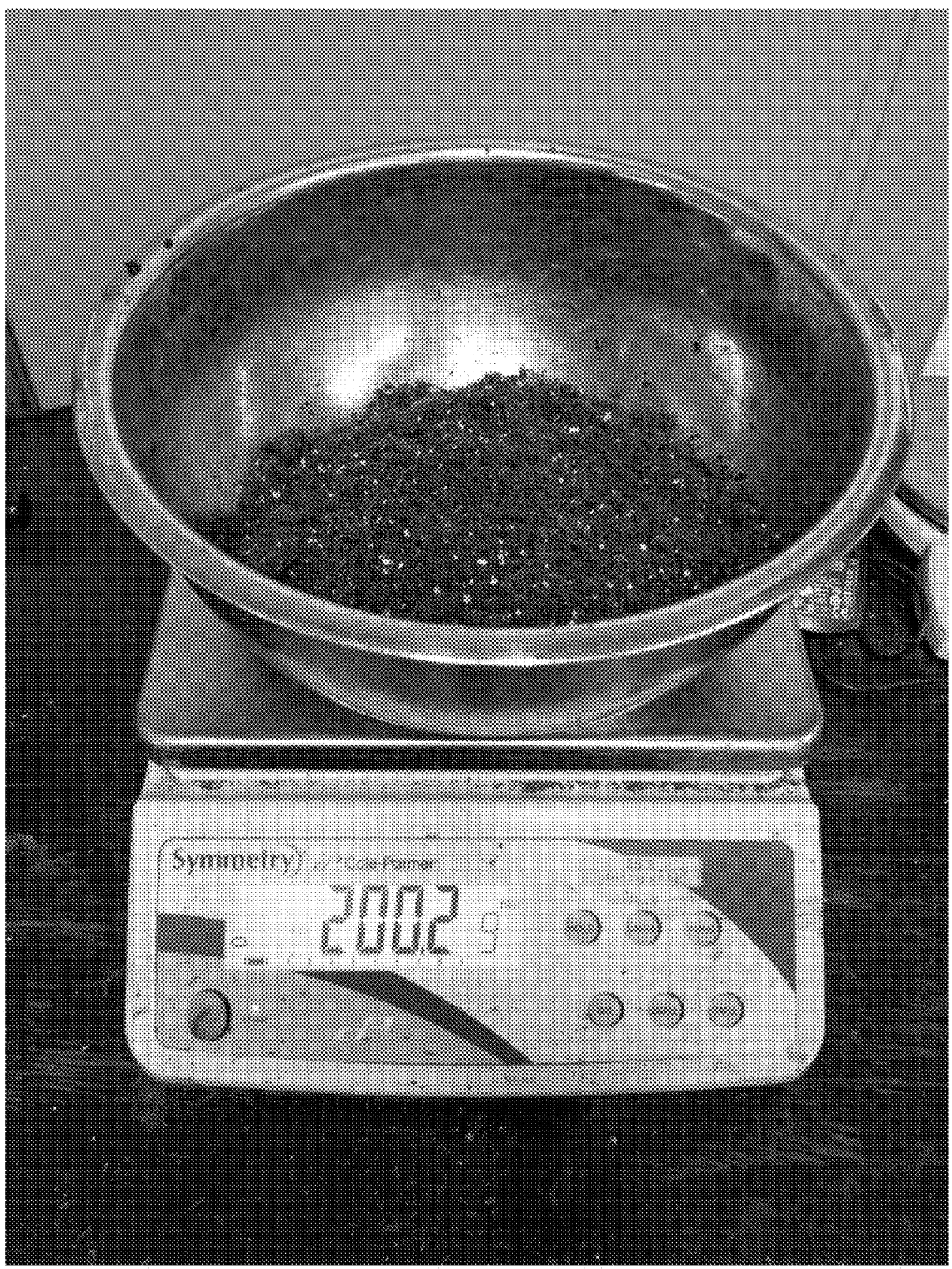
FIGS. 4A-4B: Photographs showing weighing of Jiffy Blend #30 (FIG. 4A) and H1000 cellulose fibers (FIG. 4B) in the preparation of a fibrous mixture.
Figure 4B:
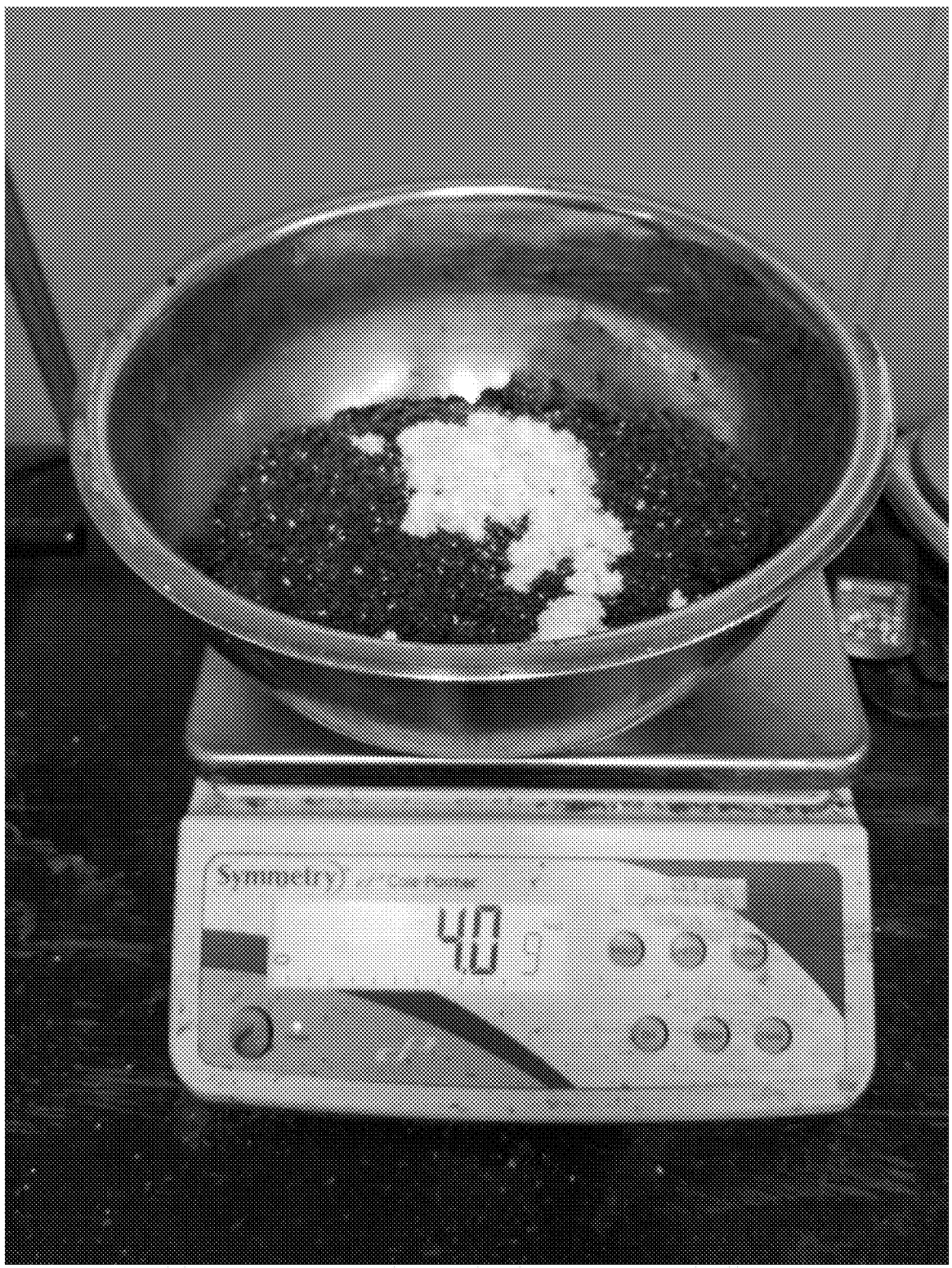
Figure 5A:
FIGS. 5A-5B: Photographs showing the mixing of Jiffy Blend #30 with H1000 cellulose fibers, during (FIG. 5A) and after (FIG. 5B) mixting to obtain a homogeneous fibrous mixture.
Figure 5B:
Figure 6:
FIG. 6: Photograph of tray filled with substrates made from fibrous mixtures of Jiffy Blend #30 and H1000, during initial watering.

Substrates were prepared by weighing 200 grams of Jiffy Blend #30, which contains 70% Canadian sphagnum peat, 20% coir, and 10% perlite, on a symmetry digital scale. (FIG. 4A.) Arbocel® H1000 cellulose fibers (J. Rettenmaier, Schoolcraft, Michigan) were added in an amount of 2% w/w to the Jiffy Blend #30. (FIG. 4B.) The materials were mixed together using a standard handheld kitchen mixer at a high shear mixing speed to separate and mix the H1000 into the Jiffy Blend #30 substrate material, creating a fibrous mixture. (FIGS. 5A-5B.) The fibrous mixture was then completely filled into an empty horticultural plant propagation tray. (FIG. 6A.) The substrate was slightly compacted to eliminate any voids, and to physically compress the fibers together. Water was then applied to the fibrous mixture until the cavity was completely saturated and excess water started to precipitate out of the bottom drainage hole of the tray.

Three additional trays were prepared as described above, with different additives or combinations of additives. Of the four total trays, one tray was filled with a fibrous mixture made from Jiffy Blend #30 and H1000 cellulose fibers, one tray was filled with a fibrous mixture made from Jiffy Blend #30 and a cellulose fiber material having recycled color magazine print and a minute amount of clay (referred to as "ETF"), one tray was filled with a fibrous mixture made from Jiffy Blend #30 and kappa-carrageenan ("Carrag"), and one tray was filled with a fibrous mixture made from Jiffy Blend #30 and both H1000 cellulose fibers and Pelbon clay ("H/Clay").

Figure 7A:
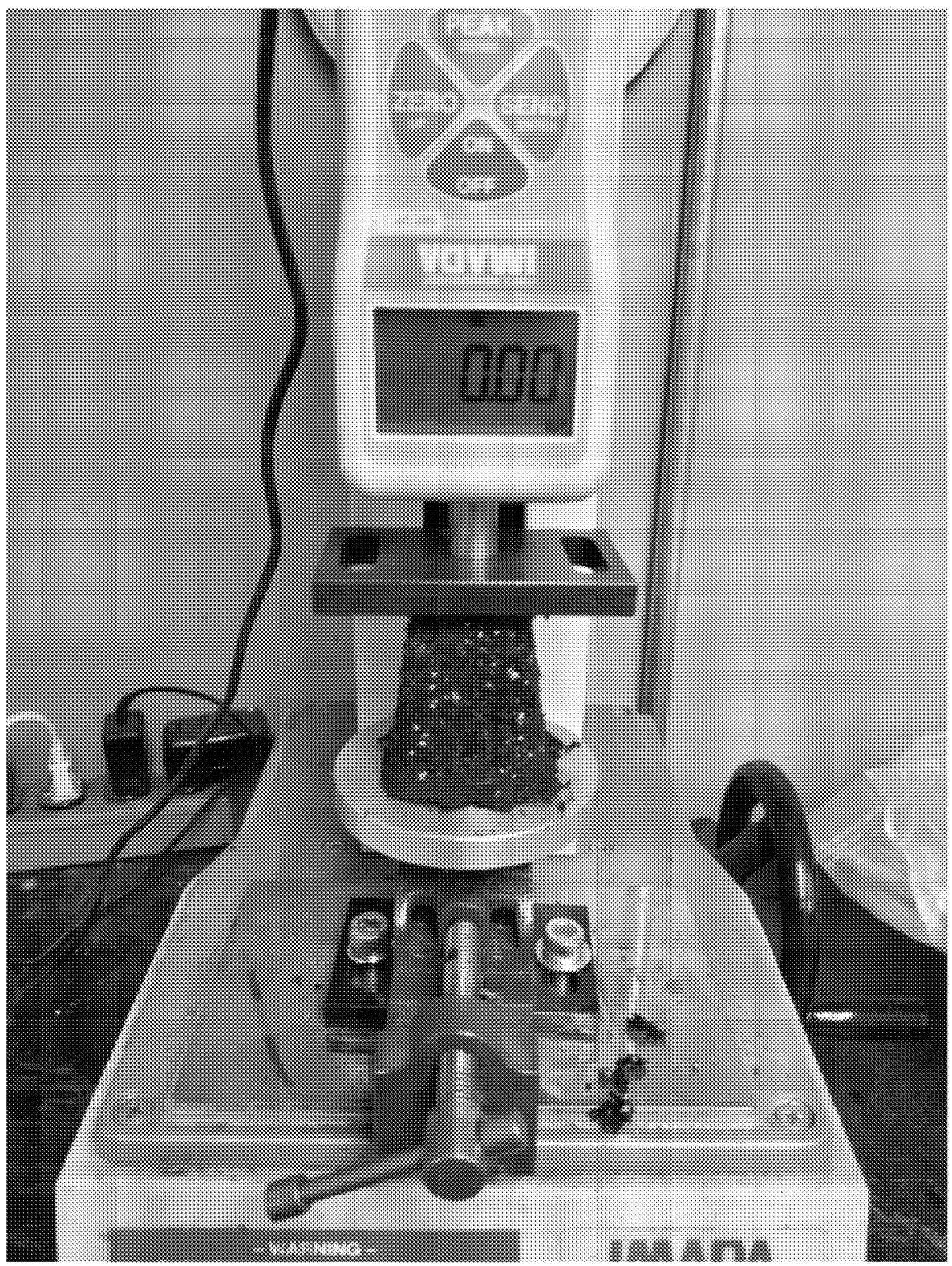
FIGS. 7A-7C: Photographs showing IMADA modulus testing device used for measuring breaking point of substrate plugs (FIG. 7A) and example substrate plugs after breaking point measurements were taken (FIG. 7B), and chart showing breaking point measurement results (FIG. 7C).
Figure 7B:
Figure 7C:
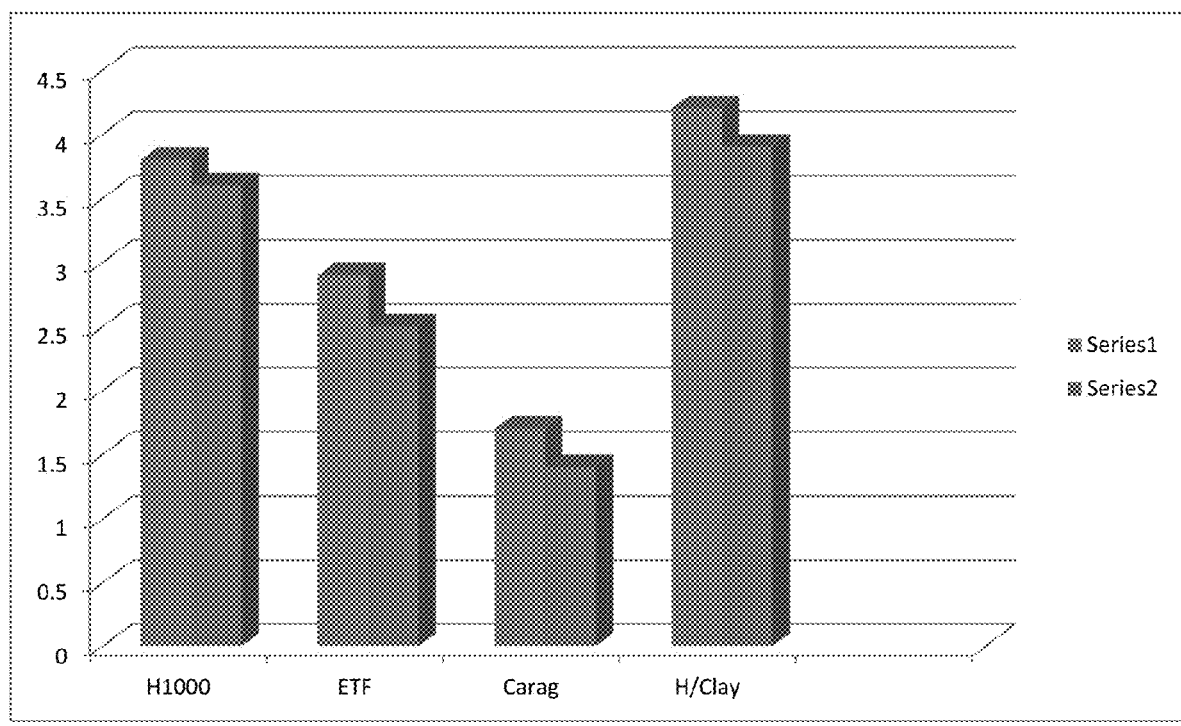

The trays were allowed to sit 24 hours before evaluating the modulus break force characteristics. Then, plugs were removed from the trays and tested in a IMADA modulus testing device. (FIG. 7A.) Pressure was applied until the break point was reached. (FIG. 7B.) Measurement of the break point were taken in two series, and were measured in LBF (pound-force) with 1 LBF equaling 4.5 N. The results are shown in FIG. 7C and the following Table 1.

TABLE 1

Measurement of break point in LBF (1 LBF equals 4.5N)

| | H1000 | ETF | Carrag | H/Clay |
|---|---|---|---|---|
| Series 1 | 3.8 | 2.9 | 1.7 | 4.2 |
| Series 2 | 3.6 | 2.5 | 1.4 | 3.9 |

As seen in FIG. 7C and Table 1, the plugs made with the H1000 showed higher force strength, which was also increased with the addition of Pelbon clay from AMCOL Bio-Ag (Hoffman Estates, IL) to the H1000. In other words, the strongest of the plugs were those having a combination of cellulose fibers and clay. Without wishing to be bound by theory, it is believed this is because the colloids in both the peat and clay increase their amount of connections with the binding effect increase with the reduction of 'free water'. Pelbon has a high cation exchange capacity (CEC), which also contributes to strong binding of the cations. The benefits of these plugs include nutrient management and compact plant growth.

Figure 8:
FIG. 8: Photograph showing a comparison between a plug comprising 2% w/w H1000 (left) and a plug comprising 2% w/w H1000 and Pelbon clay (35-40 kg/m$^3$) (right) 2.5 weeks after planting.

Plants (geraniums) were grown in the plugs prepared as described above. FIG. 8 shows a photograph comparing the plugs at 2.5 weeks from sticking of un-rooted cutting. In FIG. 8, the H1000 plug is on the left, and the H1000/clay plug is on the right. As seen from this image, the H1000/clay plug held together better than the H1000 plug. Thus, the combination of cellulose fibers and clay produces a substrate with better binding properties than cellulose fibers without clay. Furthermore, the plant on the right in FIG. 8 has a better developed root structure than the plant on the left. In other words, the plant grown in the H1000/clay plug was more developed than the plant grown in the H1000 substrate, demonstrating that plant development is enhanced from the combination of cellulose fibers and clay more than cellulose fibers without clay.

Figure 9A:
FIGS. 9A-9B: Photographs of plugs which include 2% w/w ETF, which is cellulose fiber that is insoluble in water.
Figure 9B:

An additional tray was made in the manner described above where one row of voids was filled with a fibrous mixture made from Jiffy Blend #30 and ETF, one row was filled with a fibrous mixture made from Jiffy Blend #30 and an alternative cellulose fiber product referred to as 105B, one row was filled with a fibrous mixture made from Jiffy Blend #30 and an undisclosed binder material, and one row was filled with a fibrous mixture made from Jiffy Blend #30 and a mixture of alginate and chitosan. FIG. 9A shows photographs of the tray, and FIG. 9B shows a photograph of the plugs made from Jiffy Blend #30 and ETF. Notably, ETF includes a trace amount of clay. FIG. 9A shows the trays filled with plants, and FIG. 9B shows the plugs removed from the trays, with the roots of the plants visible. As seen from FIG. 9B, these plugs held together sufficiently well after 2.5 weeks of plant growth.

Figure 10:
FIG. 10: Photograph comparing plant growth in plugs which, from left to right, include ETF (2% w/w), the cellulose fibers 105B (2% w/w), an undisclosed binder (2% w/w), and a mixture of alginate (1% w/w) and chitosan (1% w/w).

FIG. 10 shows photographs comparing plant growth in plugs which included, from left to right in FIG. 10, ETF, 105B, an undisclosed binder material, and a mixture of alginate and chitosan. As seen from FIG. 10, each of these plugs held together sufficiently well after 2.5 weeks of plant growth.

Figure 11:
FIG. 11: Photograph comparing plant root development and substrate binding between a plug that includes 2% w/w H1000 cellose fibers (left) and a Preforma plug with no cellulose fibers (right).

FIG. 11 shows a photograph comparing plant root development and substrate binding between a plug that included 2% w/w H1000 cellose fibers (on the left in FIG. 11) and a plug with no cellulose fibers (on the right in FIG. 11), where each plug included Jiffy Blend #30. Normally, it takes about 4 weeks for secondary root development. However, as seen in FIG. 11, secondary root development had begun after 2.5 weeks in the substrate that included cellulose fibers.

Simulated Greenhouse Environment

A greenhouse environment was simulated with six different plugs: Jiffy Blend #30 without cellulose fibers or other additives, Jiffy Blend #30 with H1000 cellulose fibers, Jiffy Blend #30 with Pelbon clay, Jiffy Blend #30 with H1000 cellulose fibers and Pelbon clay, Jiffy Blend #30 with chitosan (1% w/w of substrate material) and alginate (1% w/w of substrate material), and Jiffy Blend #30 with kappa-carrageenan. The greenhouse was simulated by drying with an oven, and watering the plugs every 2 hours after an initial 24 hours. The breakpoint of the plugs was measured after the initial 24 hours, then at 2 hours, 4 hours, 6 hours, and 8 hours of the greenhouse simulation. These results are displayed in Table 2 below.

TABLE 2

Breakpoint of plugs after watering and drying cycles in LBF (1 LBF equals 4.5N)

|  | 24 hours | 2 hours | 4 hours | 6 hours | 8 hours |
| --- | --- | --- | --- | --- | --- |
| Std | 2.16 | 2.13 | 2.11 | 2.28 | 2.27 |
| H1000 | 3.06 | 3.39 | 3.78 | 3.74 | 3.89 |
| Pelbon | 3.01 | 3.19 | 3.25 | 3.24 | 3.20 |
| H/P | 3.03 | 3.14 | 3.85 | 3.88 | 4.03 |
| Chito/Alg | 2.98 | 2.98 | 3.28 | 3.45 | 3.80 |
| Carrageen | 3.02 | 3.2 | 4.16 | 4.88 | 4.40 |

As seen from Table 2, an increase in strength was observed over the course of the watering and drying cycles for each of the plugs, but the strength was most significantly enhanced with the H/P plug and the carrageenan plug. This demonstrates that the combination of cellulose fibers and clay provides an enhanced strength increase over time as compared to cellulose fibers without clay or clay without cellulose fibers. The carrageen plug and the chitosan/alginate plug also exhibited marked enhancements in strength over time.

Example III

Plugs were made from the following combinations using the above-described methods: (1) Jiffy Blend #30 and 2% w/w H1000; (2) Jiffy Blend #30, 2% w/w H1000, and 2% w/w kappa-carrageenan; (3) Jiffy Blend #30, 1% w/w kappa-carrageenan, and 1% w/w chitosan; (4) Jiffy Blend #30, 1% w/w H1000, 1% w/w kappa-carrageenan, and 1% w/w chitosan; (5) Jiffy Blend #30, 1% w/w H1000, 0.5% w/w kappa-carrageenan, and 0.5% w/w chitosan; (6) Jiffy Blend #30, 0.5% w/w H1000, 0.5% w/w kappa-carrageenan, and 0.5% w/w chitosan; and (7) Jiffy Blend #30, 0.5% H1000, 0.5% kappa-carrageenan, 0.5% w/w chitosan, and 1% w/w tripolyphosphate (crosslinker). The plugs were allowed to sit for 24 hours prior to break point testing, and then watered and tested every 2 hours. The plugs were kept in a simulated greenhouse environment, at a temperature between 70-80° F. over the course of the drying time. Table 3 below displays the breakpoints measured after the initial 24 hours, then at 2 hours, 4 hours, 6 hours, and 8 hours of the greenhouse simulation.

TABLE 3

Breakpoint of plugs after watering and drying cycles in LBF (1 LBF equals 4.5N)

|  | 24 hr | 2 hr | 4 hr | 6 hr | 8 hr |
| --- | --- | --- | --- | --- | --- |
| H 1000 2% | 3.10 | 3.31 | 3.58 | 3.60 | 3.62 |
| H1000 2% + Carrageenan 2% | 3.81 | 3.90 | 4.65 | 7.11 | 7.08 |
| Carrageenan 1% + Chitosan 1% | 3.19 | 3.52 | 3.55 | 5.43 | 5.45 |
| H1000 1% + Carra 1% + Chito 1% | 3.82 | 4.02 | 5.01 | 6.43 | 5.97 |
| H1000 1% + Carr 0.5% + Chito 0.5% | 3.38 | 3.98 | 4.45 | 5.01 | 5.00 |
| H .05% + Carr 0.5% + Chito0.5% w/tripoly | 3.12 | 3.27 | 3.64 | 3.83 | 3.86 |

As seen in Table 3, plugs containing carrageenan exhibited a similar trend as plugs containing clay, namely, displaying enhanced strength following repeated watering and drying cycles. Plugs having combinations of carrageenan and cellulose fibers, as well as the combination of carrageenan and chitosan, gained significant strength over time. The combination of cellulose fibers and carrageenan, in particular, demonstrated a significant gain in strength over the course of the testing period, more than doubling from 3.81 LBF to 7.08 LBF. This shows that such plugs would gain strength over the course of the traditional crop time of 4-6 weeks in the greenhouse environment. This is also improved with the root entanglement in the plug over the course of the crop time.

Certain embodiments of the compositions and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A plant growth media composition comprising:
   a blend of plant growth substrate materials comprising coir present in an amount of about 20% by weight based on the total weight of the blend of plant growth substrate materials, peat present in an amount of about 70% by weight based on the total weight of the blend of plant growth substrate materials, and perlite present in an amount of about 10% by weight based on the total weight of the blend of plant growth substrate materials;
   cellulose fibers; and
   clay;
   wherein the clay is present in an amount ranging from about 10 kg/m$^3$ of plant growth substrate materials to about 65 kg/m$^3$ of plant growth substrate materials; and
   wherein the plant growth media composition is a homogeneous mix of the blend of plant growth substrate materials, the cellulose fibers, and the clay.

2. The plant growth media composition of claim 1, further comprising one or more additional ingredients selected from the group consisting of pine or other barks, compost, fertilizers, vermiculite, manure, granulated lava, pumice, burnt or calcined clay, mineral fibers, Hypnaceous moss, rice hulls, bagasse, sand, leaf mold, gypsum, and limestone.

3. The plant growth media composition of claim 1, wherein the cellulose fibers are present in an amount ranging from about 0.1% to about 40% by weight based on the total weight of the plant growth media composition.

4. The plant growth media composition of claim 1, wherein the cellulose fibers comprise a mixture of cellulose and lignocellulose.

5. The plant growth media composition of claim 1, wherein the cellulose fibers have an average length that ranges from about 10 μm to about 5 mm, and an average width that ranges from about 1 μm to about 500 μm.

6. The plant growth media composition of claim 1, wherein the cellulose fibers have a density ranging from about 0.5 g/cm$^3$ to about 5 g/cm$^3$, an equilibrium moisture content ranging from about 5% to about 15%, and a length-to-width ratio greater than about 10.

7. The plant growth media composition of claim 1, wherein the plant growth media composition has a moisture content, before addition of water, of from about 35% to about 45%.

8. The plant growth media composition of claim 1, further comprising a sufficient amount of water to render the moisture content of the plant growth media composition in a range of from about 65% to about 70%.

9. The plant growth media composition of claim 1, further comprising a wetting agent.

10. The plant growth media composition of claim 1, wherein the plant growth media composition has a pH ranging from about 5.5 to about 6.8.

11. The plant growth media composition of claim 1, further comprising an additional binder selected from the group consisting of polyvinyl alcohol (PVA) and polyvinyl acetate (PVAC).

12. The plant growth media composition of claim 11, further comprising a crosslinker.

13. The plant growth media composition of claim 1, wherein the plant growth media composition is in the form of compressed or expanded pellets, flat filled trays, mini blocks, or press pots.

14. The plant growth media composition of claim 1, wherein the clay comprises bentonite clay.

15. The plant growth media composition of claim 1, wherein the cellulose fibers and clay are present at a weight ratio of cellulose fibers to clay ranging from about 1:1 to about 5:1.

16. A method of making a stabilized growing media, the method comprising:
   mixing cellulose fibers and clay with a blend of plant growth substrate materials to form a fibrous mixture, wherein the blend of plant growth substrate materials comprises coir present in an amount of about 20% by weight based on the total weight of the blend of plant growth substrate materials, peat present in an amount of about 70% by weight based on the total weight of the blend of plant growth substrate materials, and perlite present in an amount of about 10% by weight based on the total weight of the blend of plant growth substrate materials, and wherein the clay is present in an amount ranging from about 10 kg/m$^3$ of plant growth substrate materials to about 65 kg/m$^3$ of plant growth substrate materials;
   configuring the fibrous mixture into a desired shape; and
   subsequently, adding water to the fibrous mixture to activate binding of the fibrous mixture and produce a stabilized growing media of the desired shape;
   wherein the stabilized growing media comprises a homogeneous mix of the blend of plant growth substrate materials, the cellulose fibers, and the clay.

17. The method of claim 16, further comprising allowing the stabilized growing media to dry for a period of time ranging from about 30 minutes to about 24 hours.

18. The method of claim 16, wherein the mixing comprises homogeneously mixing with a high shear speed.

19. The method of claim 16, further comprising compressing the fibrous mixture prior to configuring the fibrous mixture into the desired shape.

20. The method of claim 16, wherein the cellulose fibers are present in an amount of about 2% by weight based on the total weight of the stabilized growing media.

* * * * *